United States Patent [19]
Okura et al.

[11] Patent Number: 5,143,548
[45] Date of Patent: Sep. 1, 1992

[54] COATING COMPOSITION HAVING PLATELIKE IRON OXIDE PARTICLES

[75] Inventors: Ken Okura, Tokyo; Satoru Matsuzaki, Iwata; Tsutomu Katamoto; Nanao Horiishi, both of Hiroshima, all of Japan

[73] Assignees: Toda Kogyo Corp., Hiroshima; Dainichiseika Color & Chemicals Mfg. Co. Ltd., Tokyo, both of Japan

[21] Appl. No.: 800,519

[22] Filed: Dec. 3, 1991

Related U.S. Application Data

[63] Continuation-in-part of Ser. No. 756,562, Sep. 11, 1991, Pat. No. 5,112,403, which is a continuation-in-part of Ser. No. 530,862, May 31, 1990, abandoned.

[30] Foreign Application Priority Data

Jun. 5, 1989 [JP] Japan .................................. 1-143811

[51] Int. Cl.$^5$ ................................................ C09C 1/22
[52] U.S. Cl. .................................... 106/459; 106/418; 106/460; 106/495
[58] Field of Search .............. 106/413, 418, 456, 460, 106/495, 500, 459, 14.05

[56] References Cited

U.S. PATENT DOCUMENTS

| | | | |
|---|---|---|---|
| 4,404,254 | 9/1983 | Franz et al. | 428/329 |
| 4,676,838 | 6/1987 | Franz et al. | 106/304 |
| 4,753,829 | 6/1988 | Panush | 427/385.5 |

FOREIGN PATENT DOCUMENTS

| | | |
|---|---|---|
| 319918 | 6/1989 | European Pat. Off. |
| 10306224 | 8/1989 | European Pat. Off. |
| 61-281168 | 12/1986 | Japan |
| 1-263157 | 10/1989 | Japan |

OTHER PUBLICATIONS

Database WPIL No. 89-155143 Derwent Publications Ltd., London, GB Apr. 14, 1989, Abstract & JP-A-01 096 268 (Fujikura Kasei).

*Primary Examiner*—Karl Group
*Assistant Examiner*—Chris Gallo
*Attorney, Agent, or Firm*—Nixon & Vanderhye

[57] ABSTRACT

Disclosed herein is a coating composition comprising plate-like iron oxide particles having an average particle diameter of 4 to 25 μm, a lamellar thickness of 0.16 to 5 μm and a plate ratio (average particle diameter:lamellar thickness) of 5:1 to 25:1, at least one pigment selected from the group consisting of a coloring pigment, a mica pigment and a metal powder pigment, a film-forming polymer, and an organic solvent.

13 Claims, No Drawings

5,143,548

COATING COMPOSITION HAVING PLATELIKE IRON OXIDE PARTICLES

CROSS REFERENCE TO RELATED APPLICATION

The present application is a continuation-in-part of U.S. patent application, Ser. No. 07/756,562 filed on Sep. 11, 1991, now U. S. Pat. No. 5,112,403, continuation-in-part of U.S. patent application, ser. No. 07/530,862 filed on May 31, 1990.

BACKGROUND OF THE INVENTION

The present invention relates to a coating composition for protecting the bodies of automobiles or the like and at the same time displaying a soft and unique texture by way of ornament.

For a finish coating of automobiles and bicycles, a method of using a solid color coating and a method of using a metallic coating are mainly adopted.

Inorganic pigments such as titanium dioxide pigments and iron oxide pigments, and organic pigments having excellent weather resistance such as copper phthalocyanine pigments, quinacridone pigments and perylene pigments are usually used for a solid color coating.

For metallic coating, metal powder such as aluminum powder and mica are used together with the above-described organic pigments or the like so as to display a unique texture.

A coating film formed by using such a metallic coating is required to have a sufficient durability for protecting the substrate and an ornamental property (beautiful appearance).

More particularly, there is a strong demand for diversification of coating film such as coating color and ornamental property (beautiful appearance) of top coat, in order to satisfy a current trend toward individuality In particular, there is a strong demand for coating compositions which can form coating films capable of giving a variety to the unique texture of the coating film.

Iron oxide particles which are typical coloring pigment, have been used in particle shapes such as granular form, spindle-like form, plate-like form and the like.

In particular, various attempts have been conducted for plate-like ion oxide particles as a component of coating composition, since the plate-like oxide particles exhibit gloss (refer to Japanese Patent Publication Nos. 63-41853 (1988), 60-8977 (1985) and 3-52413(1991), Japanese Patent Application Laid-Open (KOKAI) No. 61-174120 (1986).

Although a coating composition which meets a demand for deversification of the coating film, such as the coating color and the ornamental property, and in particular, gives a variety to the unique texture of the coating film is strongly demanded, the coating compositions containing the above-mentioned iron oxide particles could not satisfactorily meet these demands. Therefore, coloring pigments having a high degree of transparency (low hiding power), such as a transparent iron oxide pigment, the copper phthalocyanine pigment, the quinacridone pigment and the perylene pigment are used, both in the cases of solid color coating and metallic coating. In these cases, however, there is a problem in that the hiding power of the coating film is reduced. In order to improved the hiding power of this coating film, various attempts have been conducted, such as enhancement of concentration of pigment in the coating film, thickening of the coating film and combined use with a pigment having as high hiding power. These attempts, however, are not said to be satisfied and preferred from the view point of properties of coating film. In particular, the combined use with the pigment having high hiding power has brought about a new problem of turbidity of hues.

Accordingly, it is required to provide a coating composition which can meet the demand for diversification of coating film such as a coating color and an ornamental property and can give a variety to the unique texture of the coating film, and which can form a coating film having an excellent hiding power and being suppressed turbidity of hues.

As a result of the present inventors' study, it has been found that by applying on a base plate a coating composition obtained by mixing plate-like iron oxide particles having an average particle diameter (lamellar diameter) of 4 to 25 μm, a lamellar thickness of 0.16 to 5 μm and a plate ratio (average particle diameter:lamellar thickness) of 5:1 to 25:1 and at least one of pigment selected from a group consisting of a coloring pigment, a mica pigment and a metal powder pigment, with a solution of an organic solvent containing a film-forming polymer, the thus-obtained coatings show sufficiently unique texture and soft texture, an excellent deversificative property, an excellent hiding power and free from turbidity of hues. On the basis of the finding, the present invention has been attained.

SUMMARY OF THE INVENTION

In an aspect of the present invention, there is provided a coating composition comprising plate-like iron oxide particles having an average particle diameter (lamellar diameter) of 4 to 25 μm, a lamellar thickness of 0.16 to 5 μm and a plate ratio of 5:1 to 25:1, at least one pigment selected from the group consisting of a coloring pigment, a mica pigment and a metal powder pigment, a film-forming polymer, and an organic solvent.

DETAILED DESCRIPTION OF THE INVENTION

As the plate-like iron oxide particles used in the present invention, plate-like hematite particles, plate-like magnetite particles and plate-like maghemite particles which have an average particle diameter (lamellar diameter) 4 to 25 μm, preferably 5 to 20 μm, a lamellar thickness of 0.16 to 5 μm, preferably 0.18 to 3.0 μm and a plate ratio (average particle diameter:lamellar thickness) of 5:1 to 24:1, preferably 7:1 to 20:1.

The plate-like hematite particles having an average particle diameter of 4 to 25 μm, a lamellar thickness of 0.16 to 5μm and a plate ratio of 5:1 to 25:1 can be produced by the following method.

If plate-like iron oxide particles having an average particle diameter, a lamellar thickness an a plate ratio which are out of the ranges of the present invention are used, it is difficult to produce the coating composition having effects of the present invention.

A method (i) comprising autoclaving at a temperature of 200 to 300° C. an alkaline suspension containing iron (III) hydroxide oxide particles and polycrystalline acicular hematite particles obtained by dehydrating acicular iron (III) hydroxide oxide particles at a temperature of 260° to 750° C., pH of the alkaline suspension being not less than 13; and a method (ii) comprising autoclaving an alkaline suspension containing iron (III) hydroxide oxide particles at a temperature between 200° and 300° C. and pH of not less than 13, may be exemplified.

The alkaline suspension in the method (i) contains 2~15 wt. % of the iron (III) hydroxide oxide particles and 0.0004~0.2 wt. % of the polycrystalline acicular hematite particles. Also, the alkaline suspension in the method (ii) contains 2~15 wt. % of the iron (III) hydroxide oxide particles. The autoclaving method in the present invention is carried out by using an autoclave at a temperature of ordinarily 200° to 300° C., preferably 250° to 300° C. for 2 to 6 hours. It is a general tendency that the higher the alkali concentration is, the lower is the reaction temperature for producing plate-like hematite particle. If the temperature is lower than 200° C., the suspension contains iron (III) oxide hydroxide, thereby producing no plate-like hematite particles. If the temperature is higher than 300° C., the production of the plate-like hematite particles is possible, but when the safety of the autoclave is taken into consideration, the upper limit of the temperature is 300° C.

The plate-like magnetite particles having an average particle diameter (lamellar diameter) of 4 to 25 μm, a lamellar thickness of 0.16 to 5 μm and a plate ratio (average particle diameter:lamellar thickness) of 5:1 to 25:1 according to the present invention are obtained by reducing the thus obtained plate-like hematite particles at a temperature of 300° to 450° C. in a reducing gas such as hydrogen.

The plate-like maghemite particles having an average particle diameter (lamellar diameter) of 4 to 25 μm, a lamellar thickness of 0.16 to 5 μm and a plate ratio (average particle-diameter:lamellar thickness) of 5:1 to 25:1 according to the present invention are obtained by oxidizing the thus-obtained plate-like magnetite particles at a temperature of 200° to 400° C. in an oxigen-containing gas such as air.

By the method (i), plate-like hematite particles having an average particle diameter of 4 to 8 μm, a lamellar thicknesses of 0.1 to 0.5 μm and a plate ratio of 7 to 25 can be easily produced. The more the mixing ratio of the polycrystalline acicular hematite particles to the iron (III) hydroxide oxide particles is increased, the less the average particle diameter (Lamellar diameter) of the produced plate-like hematite particles becomes to be decreased. According to this method (i), the plate ratio of the plate-like hematite particles is increased, thereby obtaining plate-like hematite particles having an excellent particle orientation and a sharp particle size distribution. Furthermore, with this method (i), the plate-like hematite particles can be produced in a shorter time.

As the acicular iron (III) hydroxide particles, α-FeOOH, β-FeOOH and γ-FeOOH which have a major axis diameter of 0.05 to 3 μm and an aspect ratio (major axis diameter/minor axis diameter) of 3 to 30 are usable. The polycrystalline acicular hematite particles having a major axis diameter of 0.05 to 3 μm, an aspect ratio (major axis diameter/minor axis diameter) of 3 to 30, BET specific surface area of 10 to 150 $M^2/g$ and crystalline size of 50 to 500Å.

The NaOH content in the alkaline suspension is 0.1 to 10N, preferably 0.3 to 6 N and the Fe concentration therein is 0.05 to 1.5 mol/l, preferably 0.2 to 1.2 mol/l.

With the method (ii), plate-like hematite particles having an average particle diameter of 8 to 25 μm, a lamellar thickness of 0.5 to 6 μm and a plate ratio of 5 to 10 can be easily produced.

The iron (III) oxide hydroxide particles in the method (ii) may have any particle form such as an acicular form and a spindle form that is obtained by a conventional reaction method. It is possible to use a wet-cake obtained by washing a reaction mother liquor containing iron (III) oxide hydroxide with water, a dried wet-cake thereof or the reaction mother liquid. The NaOH content is the alkaline suspension of 1 to 10 N, preferably 3 to 6 N and the Fe concentration therein is 0.05 to 1.5 mol/l, preferably 0.2 to 1.2 mol/l.

The more the concentration of NaOH in the alkaline suspension is increased, the more the average particle diameter (lamellar diameter) of the produced plate-like iron oxide particles is increased.

In a coating composition of the present invention, the amount of the plate-like iron oxide particles used is 0.005 to 50 parts by weight, preferably 1 to 30 parts by weight based on 100 parts by weight of the coating composition.

If it is less than 0.005 parts by weight, the coating composition having the effects of the present invention cannot obtained. If it is more than 50 parts by weight, the physical properties of the coating film therefore tend to lower.

The pigment(s) according to the present invention is at least one selected from the group consisting of a coloring pigment, a metal powder pigment and a mica pigment.

The coloring pigment used in the present invention is one which is used for ordinary coating such as a quinacridone pigment, perylene pigment, copper phthalocyanine pigment, anthraquinone pigment, metal complex pigment, transparent iron oxide pigment and carbon black.

As a metal powder pigment, aluminum powder pigments, stainless steel powder pigments, copper powder pigments are usable in the present invention. Among these, aluminum powder pigments are preferably used.

As a mica pigment known mica pigments are usable in a wide range such as transparent pearl mica, colored mica and interfered mica. When several kinds of the colored mica which show a different color are jointly used, the coating film showing an excellent ornamental property (beautiful appearance) can be obtained.

The coloring pigment, the mica pigment and the metal powder pigment may be used singly or in the form of a mixture. The amount of the coloring pigment is not more than 30 parts by weight, preferably 0.1 to 30 parts by weight based on 100 parts by weight of the coating composition. The amount of the mica pigment is not more than 30 parts by weight, preferably 0.1 to 30 parts by weight based on 100 parts by weight of the coating composition. The amount of the metal powder pigment is not more than 30 parts by weight, preferably 0.1 to 30 parts by weight based on 100 parts by weight of the coating composition.

The amount of the pigment(s) according to the present invention is 0.01 to 10,000 parts by weight, preferably 0.1 to 5000 parts by weight based on 100 parts by weight of plate-like iron oxide particles and 0.005 to 50 parts by weight, preferably 0.1 to 30 parts by weight based on 100 parts by weight of the coating composition. If it is less than 0.01 part by weight based on 100 parts by weight of plate-like iron oxide particles and less than 0.005 parts by weight based on 100 parts by weight of the coating composition, it is difficult to fully display the unique texture in the aesthetic view. On the other hand, if it is more than 10,000 parts by weight based on 100 parts by weight of plate-like iron oxide particles and more than 50 parts by weight based on 100 parts by weight of the coating composition, the unique texture of the coating film is impaired.

As the film-forming polymer used in the present invention, acrylic resins, acryl melamine resins, vinyl chloride-vinyl acetate copolymers, alkyd resins, polyesters, polyurethanes and amino resins which are polymers conventionally used in the field of coating, may be exemplified. However, the polymer used in the present invention is not restricted to these resins. The amount of film-forming polymer in the present invention is about 30 to 60 parts by weight, preferably 30 to 50 parts by weight based on 100 parts by weight of the coating composition.

A conventionally well known organic solvent for coatings is used as an organic solvent in which the film-forming polymer is dissolved or dispersed. For example, toluene, xylene, butyl acetate, ethyl acetate, methyl acetate, acetone, methylethyl ketone, methylisobutyl ketone, methanol, ethanol, butanol and cyclohexane are usable. The amount of organic solvent used is 5 to 60 parts by weight, preferably 10 to 50 parts by weigtht based on 100 parts by weight of the coating composition.

A filler, an antistatic agent, a stabilizer, an antioxidant, an ultraviolet absorber, etc. may be added to the coating composition of the present invention, if necessary.

In order to form a coating film by using the coating composition of the present invention, the plate-like iron oxide particles having an average particle diameter (lamellar diameter) of 4 to 25 μm, a lamellar thickness of 0.16 to 5μm and a plate ratio of 5:1 to 25:1 and at least one pigment selected from the group consisting of a coloring pigment, a mica pigment and a metal powder pigment are mixed with an organic solvent solution containing a film-forming polymer by a sand mill, a high-speed mixer or the like. Thus-obtained coating composition is applied on a base plate such as metal plate, glass plate, ceramic plate, plastic plate and enamel plate, a based plate coated by electrodeposition, an undercoated base plate or a second-coated base plate by spray-coating method, flow-coating method or roll-coating method, and dried to form a colored coating layer. A clear coating agent prepared by dissolving or dispersing a resin similar to the film-forming polymer in an organic solvent, is applied on the colored coating layer as a base coat layer, dried ordinarily and heat-treated to form a coating film.

In the case of preparing a coating composition of the present invention, it is preferable to prepare base coatings by mixing each of plate-like iron oxide particles, coloring pigment, mica pigment and metal powder pigment with the organic solvent solution of the film-forming polymer, thereby obtaining the respective base coating and to mix predetermined amount of the respective base coatings obtained.

A coating film formed by applying the coating composition of the present invention on a substrate can give a delicate change in the paint color thereof, resulting in an excellent ornamental property (beautiful appearance). Namely, the coating composition of the present invention generates the ornamental property in that the color tone of the coloring pigment in the high-light region where the quantity of the reflected light is large, is emphasized while the color tone of the plate-like iron oxide particles of the shade portion where the quantity of the reflected light is small, is emphasized. The variation in the quantity of reflected light produces a difference of the luminosity and the chroma according to the viewing direction, thereby imparting a peculiar texture of the paint color.

Hereinafter such ornamental property (beautiful appearance) of the present invention is referred as "a geometrical metamerism".

The coating composition obtained by mixing plate-like iron oxide particles and coloring pigment with the organic solvent solution of the film-forming polymer can form a coating film showing an excellent gesmetrical metamerism and is particularly preferred.

As seen from Examples and Comparative Examples described later, coating films obtained by applying each coating composition produced by using (1) in combination of plate-like oxide particles having an average particle diameter, a lamellar thickness and a plate ratio which are out of the range of the present invention and at least one selected from the group consisting of coloring pigment, mica pigment and metal powder pigment; (2) plate-like iron oxide particles having specified average particle diameter, lamellar thickness and plate ratio of the present invention without mixing at least one selected from the coloring pigment, mica pigment and metal powder; and (3) at least one pigment selected from the group consisting of coloring pigment, mica pigment and metal powder pigment, without mixing plate-like iron oxide particles having specified average particle diameter, lamellar thickness and plate ratio of the invention, failed to have an excellent effect of the present invention. The present inventors, therefore, consider that the above-described peculiar effect of the present invention is attributable to a synergistical effect of the use in combination of the plate-like oxide particles having the specified average particle diameter, lamellar thickness and plate ratio of the present invention, and at least one selected from the group consisting of coloring pigment, mica pigment and metal powder pigment.

Coating films of red-based colors are obtained when plate-like hematite particles having specified average particle diameter, lamellar thickness and plate ratio of th present invention are used. Coating films of black-based colors are obtained when plate magnetite particles having specified average particle diameter, lamellar thickness and plate ratio of th present invention are used. Coating films of brown-based colors are obtained when plate-like maghemite particles having specified average particle diameter, lamellar thickness and plate ratio of th present invention are used.

A coating film obtained by applying the coating composition of the present invention has not less than 10, preferably not less than 11 of $\Delta H$ and not less than 15, preferably not less than 16 of $\Delta C$ (wherein $\Delta H$ and $\Delta C$ are obtained from the changing rate of the hue and chroma when the incident angle is fixed to 70°and the light receiving angles are set to $-45°$ and $+45°$), and not more than 40 μM, preferably not more than 39 μM of the hiding power.

The coating composition in accordance with the present invention can provide a diversification of the coating color and an excellent geometrical metamerism, in particular a variety to the texture of the coating film. Furthermore, the coating composition of the present invention can give an excellent hiding power and can suppress turbidity of hues, thereby enabling a coating design with high chroma. The coating composition of the present invention, therefore, can suitably used as the material for protective an ornamental coating of automobiles and motorcycles.

EXAMPLES

The present invention will be more precisely explained while referring to Examples as follows.

However, the present invention is not restricted to Examples under mentioned. From the foregoing description, one skilled in the art can easily ascertain the essential characteristics of the present invention, and without departing from the spirit and scope thereof, can make various changes and modifications of the invention to adapt it to various usages and conditions.

"Part" and "%" in the Examples and Comparative Examples mean "part by weight" and "% by weight", respectively.

PRODUCTION EXAMPLE 1

Acicular α-FeOOH particles [average major axis diameter:1μM, aspect ratio (major axis diameter:minor axis diameter):20:1, BET specific surface area:60 m$^2$/g] were heat-dehydrated at 400° C. for 1 hour, thereby obtainning polycrystalline acicular hematite particles [average major axis diameter:1μM, aspect ratio (major axis diameter:minor axis diameter):20:1, BET specific surface area:80 m$^2$/g, crystalline size;80Å] as seed particles. 0.0044 mol of the seed particles (corresponds to 0.5 wt. % based on α-FeOOH), 0.8 mol of α-FeOOH [average major axis diameter:3 82 M, aspect ratio (major axis diameter/minor axis diameter):10, BET specific surface area:20 M$^2$/g] and 0.3 mol of NaOH were mixed together to form an alkaline suspension of pH13.2. This alkaline suspension was heated in an autoclave up to a temperature of 245° C. and was held at this temperature for about 2hours, while being stirred mechanically, thereby obtaining a dark-violet precipitate.

After being coolled down to the room temperature, the dark-violet precipitate was filtered, washed sufficiently with water and dried.

The dried particles were hematite particles as shown from the X-ray diffration pattern. The hematite particles thus-obtained had an average particle diameter (lamellar diamter) of 6 μm, a lamellar thickness of 0.31 μm and a plate ratio (average particles diameter:lamellar thickness) of 19:1, as is clear from an electron micrograph.

PRODUCTION EXAMPLE 2

Dark-violet particles was obtained by the same process as Production Example 1 except that an amount of the seed particles was 0.0019 mol (corresponds to 0.025 wt. % based on α-FeOOH), an amount of the α-FeOOH was 0.7 mol, an amount of NaOH was 0.4 mol and the autoclaving-treatment were conducted at 240° C. for 3 hours. As a result of an X-ray diffraction pattern, the thus-obtained dark-violet precipitate particles were hematite particles. The average particle diameter, the lamellar thickness and the plate ratio thereof were respectively 8 μm, 0.35 μm and 23:1, as is clear from an electron micrograph.

PRODUCTION EXAMPLE 3

Dark-violet particles were obtained by the process which was the same as Production Example 1 except that the seed particles were not used, an amount of the α-FeOOH was 0.8 mol, an amount of NaOH was 3 mol and the autoclaving-treatment was conducted at 225° C. for 3 hours. As a result of an X-ray diffraction pattern, the thus-obtained dark-violet precipitate particles were hematite particles. The average particle diameter, the lamellar thickness and the plate ratio thereof were respectively 10 μm, 1.3 μm and 8:1, as is clear from an electron micrograph.

PRODUCTION EXAMPLE 4

Acicular α-FeOOH particles [average major axis diameter:1:5 μm, aspect ratio (major axis diameter:minor axis diameter):15:1, BET specific surface area 35 m$^2$/g] were heat-dehydrated at 400° C. for 1 hour, thereby obtaining polycrystalline acicular hematite particles [average major axis diameter:1:5 μm, aspect ratio (major axis diameter:minor axis diameter):15:1, BET specific surface area 45m$^2$/g, crystalline size 110Å], were obtained as seed particles. 0.00018 mol of the seed particles (corresponds to 0.02 wt. % to α-FeOOH), 0.8 mol of α-FeOOH [average major axis diameter:2.5 μm, aspect ratio (major axis diameter/minor axis diameter):12 and BET specific surface area:22 m$^2$/g] and 0.2 mol of NaOH were mixed together to form an alkaline suspension of pH13.0. This alkaline suspension was heated in an autoclave up to a temperature of 255° C. and was held at this temperature for about 3 hours, while being stirred mechanically, thereby obtaining a dark-violet precipitate. After being cooled down to the room temperature, the dark-violet precipitate was filtrated, washed sufficiently with water and dried. The dried particles were charged into a retort reducing vessel and H$_2$ gas was blown at a rate of 10 l/min for 2 hrs, while rotating the vessel and heating to the temperature of 400° C., thereby obtaining black particles.

The black particles were magnetite particles as seen from the X-ray diffraction pattern. The magnetite particles thus-obtained had an average particle diameter (lamellar diameter) of 7 μm, as lamellar thickness of 0.39 μm and a plate ratio (average particle diameter:lamellar thickness) of 18:1, as is clear from an electron micrograph.

PRODUCTION EXAMPLE 5

Dark-violet particles was obtained by the same process as Production Example 1 except that the seed particles were not used, an amount of the α-FeOOH was 1.0 mol, an amount of NaOH was 5 mol and the autoclaving-treatment were conducted at 245° C for 2 hours.

Black particles were obtianed by the same process as Production Example 4 except for the heat-reducing temperature of 380° C. and the heat-reducing time of 1.5 hours. As a result of the X-ray diffraction pattern, the thus-obtained black particles were magnetite particles. The average particle diameter and the lamellar thickness and the plate ratio thereof were respectively 11 μm, 1.4 μm and 8:1, as is clear from an electron micrograph.

PRODUCTION EXAMPLE 6

Dark violet particles were obtained by the process which was the same as Production Example 1 except that the seed particles were not used, an amount of the α-FeOOH was 1.3 mol, and amount of NaOH was 8 mol and the autoclaving-treatment were conducted at 240 ° C. for 4 hours. Black particles were obtained by the same process as Production Example 4 except for the heat-reducing temperature of 400° C. and the heat-reducing time of 1 hour. As a result of an X-ray diffraction pattern, the thus-obtained black particles were magnetite particles. The average particle diameter, the lamellar thickness and the plate ratio thereof were respectively 15 μm, 2.2 μm and 7:1, as is clear from an electron micrograph.

PRODUCTION EXAMPLE 7 the magnetite particles obtained by the Production Example 4 were heat-treated at a temperature of 280° C. in air, thereby obtaining maghemite particles. The maghemite particles thus-obtained had an average particle diameter (lamellar diameter) of 15 μm, a lamellar thickness of 0.39 μm and a plate ratio (average particle diameter:lamellar thickness) of 18:1, as is clear from an electron micrograph.

PRODUCTION EXAMPLE 8

Corresponds to Example 7 of Japanese Patent Publication No. 63- 41853

$\alpha$-FeOOH and 0.89 wt. % of $SiO_2$ with respect to $\alpha$-FeOOH were added to water, thereby obtaining a suspension. Then, 45 wt. % of conc.sodium hydroxide was added to the resultant suspension, so that the $\alpha$-FeOOH content and the NaOH content in the thus-obtained suspension were 130 g/l and 320 g/l, respectively. The thus-obtained suspension was heated to 240° C. in an autoclave and maintained at this temperature of 4 hours therein, therby obtaining dard violet precipitate. After being cooled down to the room temperature, the dark violet precipitate was filtrated, washed sufficiently with water and dried.

The dried particles were hematite particles as seen from X-ray diffraction pattern. The hematite particles thus-obtained had an average particle diameter of 5.3 μm, lamellar thickness of 0.14 μm and a plate ratio of 38:1, as is clear from electron micrograph.

EXAMPLES 1 AND 3

| (Mixture A) | |
|---|---|
| Plate-like hematite particles [obtained in PRODUCTION EXAMPLE 1 (average particle) diameter: 6 μm, lemellar thickness: 0.31 μm and plate ratio: 19:1] | 30 parts |
| Acryl varnish (solid content: 60%) | 82 parts |
| Melamine varnish (solid content: 60%) | 34 parts |
| Mixed solvent of Solbesso 100 (produced by Tonen Sekiyu Kagaku Co., Ltd.)/ butyl acetate (weight ratio: 7/3) | 30 parts |
| (Mixture B) | |
| Plate-like hematite particles [obtained in PRODUCTION EXAMPLE 2 (average particle diameter: 8 μm, lamellar thickness: 0.35 μm and plate ratio: 23:1)] | 30 parts |
| Acryl varnish (solid content: 60%) | 82 parts |
| Melamine varnish (solid content: 60%) | 34 parts |
| Mixed solvent of Solbesso 100/butyl acetate (weight ratio: 7/3) | 30 parts |
| (Mixture C) | |
| Plate-like hematite particles [obtained in PRODUCTION EXAMPLE 3 (average particle diameter: 10 μm, lamellar thickness: 1.3 μm and plate ratio: 8:1)] | 30 parts |
| Acryl varnish (solid content: 60%) | 82 parts |
| Melamine varnish (solid content: 60%) | 34 parts |
| Mixed solvent of Solbesso 100/butyl acetate (weight ratio: 7/3) | 30 parts |
| (Mixture D) | |
| Quinacridone pigment (coloring pigment) [Chromofine Red 6820, produced by Dainichi Seika Industries Co. Ltd.] | 10 parts |
| Acryl varnish (solid content: 60%) | 82 parts |
| Melamine varnish (solid content: 60%) | 34 parts |
| Mixed solvent of Solbesso 100/butyl acetate (weight ratio: 7/3) | 30 parts |

Mixtures A to D were respectively dispersed by a sand mill. 50 parts of each of Mixtures A to C and 50 parts of Mixture D were uniformly mixed to obtain coating compositions I to III (containing 8.55 parts by weight of plate-like hematite particles and 3.2 parts by weight of the quinacridone pigment based on 100 parts by weight of the coating composition).

COMPARATIVE EXAMPLE 1

| (Mixture E) | |
|---|---|
| Granular hematite particles (average particle diameter: 0.3 μm) [120 ED, produced by Toda Kogyo Corporation] | 30 parts |
| Acryl varnish (solid content: 60%) | 82 parts |
| Melamine varnish (solid content: 60%) | 34 parts |
| Mixed solvent of Solbesso 100/butyl acetate (weight ratio: 7/3) | 30 parts |

Mixture E was dispersed by a sand mill. 50 parts of Mixture D and 50 parts of Mixture E were uniformly mixed to obtain a coating composition (containing 8.55 parts by weight of granular hematite particles and 3.2 parts by weight of the quinacridone pigment based on 100 parts by weight of the coating composition). [Comparative Coating Composition I).

EXAMPLES 4 TO 6

| (Mixture F) | |
|---|---|
| Plate-like magnetite particles [obtained in PRODUCTION EXAMPLE 4 (average particle diameter: 7 μm, lamellar thickness: 0.39 μm and plate ratio: 18:1) | 30 parts |
| Acryl varnish (solid content: 60%) | 82 parts |
| Melamine varnish (solid content: 60%) | 34 parts |
| Mixed solvent of Solbesso 100/butyl acetate (weight ratio: 7/3) | 30 parts |
| (Mixture G) | |
| Plate-like magnetite particles [obtained in PRODUCTION EXAMPLE 5 (average particle diameter: 11 μm, lamellar thickness: 1.4 μm and plate ratio: 8:1) | 30 parts |
| Acryl varnish (solid content: 60%) | 82 parts |
| Melamine varnish (solid content: 60%) | 34 parts |
| Mixed solvent of Solbesso 100/butyl acetate (weight ratio: 7/3) | 30 parts |
| (Mixture H) | |
| Plate-like magnetite particles [obtained in PRODUCTION EXAMPLE 6 (average particle diameter: 15 μm, lamellar thickness: 2.2 μm and plate ratio: 7:1) | 30 parts |
| Acryl varnish (solid content: 60%) | 82 parts |
| Melamine varnish (solid content: 60%) | 34 parts |
| Mixed solvent of Solbesso 100/butyl acetate (weight ratio: 7/3) | 30 parts |

Mixtures F to H were respectively dispersed by a sand mill. 50 parts of each of Mixtures F to H and 50 parts of Mixture D were uniformly mixed to obtain coating compositions IV to VI (containing 8.55 parts by weight of plate-like magnetite particles and 3.2 parts by weight of quinacidrone pigment based on 100 parts by weight of the coating composition).

EXAMPLES 7 TO 9

| (Mixture I) | |
|---|---|
| Carbon black (FW-200, produced by Degsa Co. Ltd.) | 3 parts |
| Acryl varnish (solid content: 60%) | 60 parts |
| Melamine varnish (solid content: 60%) | 20 parts |
| Mixed solvent of Solbesso 100/butyl acetate (weight ratio: 7/3) | 17 parts |
| (Mixture J) | |
| Pearl white (produced by Marl Corp.) | 30 parts |
| Acryl varnish (solid content: 60%) | 82 parts |
| Melamine varnish (solid content: 60%) | 34 parts |
| Mixed solvent of Solbesso 100/butyl acetate (weight ratio: 7/3) | 30 parts |

Mixture I was dispersed by a sand mill, thereby obtaining a carbon black coating-base material. Mixture J was dispersed by a high speed mixer, thereby obtaining a pearl coating-base material.

Mixtures D, G, I and J were respectively uniformly mixed at the following mixing ratio by a stirrer to obtain coating compositions VII to IX.

| Coating Composition VII | |
|---|---|
| Mixture D | 70 parts |
| Mixture G | 30 parts |

The thus-obtained coating composition contains 5.13 parts by weight of plate-like magnetite particles and 4.48 parts by weight of quinacridone pigment based on 100 parts by weight of the coating composition.

| Coating Composition VIII | |
|---|---|
| Mixture D | 60 parts |
| Mixture G | 30 parts |
| Mixture I | 2 parts |
| Mixture J | 8 parts |

The obtained coating composition contains 5.13 part by weight of plate-like magnetite particles, 3.84 parts by weight of quinacridone pigment, 0.06 part by weight of carbon black and 1.37 parts by weight of pearl pigment based on 100 parts by weight of the coating composition.

| Coating Composition IX | |
|---|---|
| Mixture D | 50 parts |
| Mixture G | 25 parts |
| Mixture I | 5 parts |
| Mixture J | 30 parts |

The obtained coating composition contains 4.275 part by weight of plate-like magnetite particles, 3.2 parts by weight of quinacridone pigment, 0.15 parts by weight of carbon black and 3.42 parts by weight of pearl pigment based on 100 parts by weight of the coating composition.

COMPARATIVE EXAMPLES 2 to 3

Mixtures D, I and J were uniformly mixed at the following mixing ratio by a stirrer to obtain coating compositions.

| Comparative Coating Composition II | |
|---|---|
| Mixture D | 80 parts |
| Mixture I | 10 parts |
| Mixture J | 10 parts |

The obtained coating composition contains 5.12 parts by weight of quinacridone pigment, 0.3 part by weight of carbon black and 1.71 parts by weight of pearl pigment based on 100 parts by weight of the coating composition.

| Comparative Coating Composition III | |
|---|---|
| Mixture D | 70 parts |
| Mixture I | 20 parts |
| Mixture J | 10 parts |

The obtained coating composition contains 4.48 parts by weight of quinacridone pigment, 0.6 part by weight of carbon black and 1.71 parts by weight of pearl pigment based on 100 parts by weight of the coating composition.

COMPARATIVE EXAMPLE 4

| (Mixture K) | |
|---|---|
| Granular magnetite particles (average particle diameter: 0.3 μm)[KN-320, produced by Toda Kogyo Corp.] | 30 parts |
| Acryl varnish (solid content: 60%) | 82 parts |
| Melamine varnish (solid content: 60%) | 34 parts |
| Mixed solvent of Solbesso 100/butyl acetate (weight ratio: 7/3) | 30 parts |

Mixture K was dispersed by a sand mill. 30 parts of Mixture K and 70 parts of Mixture D were uniformly mixed to obtain a coating composition (containing 8.55 parts by weight of granular magnetite particles and 3.2 parts by weight of quinacridone pigment based on 100 parts by weight of the coating composition) [Comparative Coating Composition IV].

COMPARATIVE EXAMPLE 5

| (Mixture L) | |
|---|---|
| Plate-like hematite particles [obtained in PRODUCTION EXAMPLE 8 (average particle diameter: 5.3 μm, lamellar thickness: 0.14 μm and plate ratio: 38:1)] | 30 parts |
| Acryl varnish (solid content: 60%) | 82 parts |
| Melamine varnish (solid content: 60%) | 34 parts |
| Mixed solvent of Solbesso 100/ butyl acetate (weight ratio: 7/3) | 30 parts |

Mixture L was dispersed by a sand mill. 50 parts of Mixture L and 50 parts of Mixture D were uniformly mixed to obtain a coating composition (containing 8.55 parts by weight of plate-like hematite particles and 3.2 parts by weight of the quinacridone pigment based on 100 parts by weight of the coating composition) [Comparative Coating Composition V].

COMPARATIVE EXAMPLE 6

| (Mixture M) | |
|---|---|
| Transperant iron oxide particles (average particle diameter: 0.02 μm, | 30 parts |

-continued

| (Mixture M) | |
|---|---|
| produced by Dainichiseika Industries Co. Ltd.) | |
| Acryl varnish (solid content: 60%) | 82 parts |
| Melamine varnish (solid content: 60%) | 34 parts |
| Mixed solvent of Solbesso 100/ butyl acetate (weight ratio: 7/3) | 30 parts |

Mixture M was dispersed by a sand mill. 50 parts of Mixture M and 50 parts of Mixture D were uniformly mixed to obtain a coating composition (containing 8.55 parts by weight of transparent iron oxide particles and 3.2 parts by weight of quinacridone pigment based on 100 parts by weight of the coating composition) [Comparative Coating Composition VI].

COMPARATIVE EXAMPLE 7

Mixture B was dispersed by a sand mill to obtain a coating composition (containing 17.1 parts by weight of plate-like hematite particles) [Comparative Coating Composition VII].

EXAMPLE 10

Mixture J was dispersed by a high-speed mixer. 50 parts of Mixture J and 50 parts of Mixture A were uniformly mixed to obtain a coating composition X (containing 8.55 parts by weight of plate-like hematite particles and 8.55 parts by weight of the mica pigment based on 100 parts by weight of the coating composition).

EXAMPLE 11

| (Mixture N) | |
|---|---|
| Aluminum pigment (tradename: 7130N, produced by Toyo Aluminum Co., Ltd.) | 30 parts |
| Acryl varnish (solid content: 60%) | 82 parts |
| Melamine varnish (solid content: 60%) | 34 parts |
| Mixed solvent of Solbesso 100/butyl acetate (weight ratio: 7/3) | 30 parts |
| Mixture A | 50 parts |
| Mixture D | 10 parts |
| Mixture N | 40 parts |

Mixtures A, D and N were uniformly mixed to obtain a coating composition XI (containing 8.55 parts by weight of plate-like hematite particles, 0.64 parts by weight of the quinacridone pigment and 4.44 parts by weight of the aluminum pigment based on 100 parts by weight of the coating composition).

EXAMPLE 12

| Mixture F | 50 parts |
|---|---|
| Mixture D | 10 parts |
| Mixture N | 40 parts |

Mixtures F, D and N were uniformly mixed to obtain a coating composition XII (containing 8.55 parts by weight of plate-like magnetite particles, 0.64 parts by weight of the quinacridone pigment and 4.44 parts by weight of the aluminum pigment based on 100 parts by weight of the coating composition).

EXAMPLE 13

| (Mixture O) | |
|---|---|
| Plate-like hematite particles [obtained in PRODUCTION EXAMPLE 7 (average particle diameter: 7 μm, lamellar thickness: 0.39 μm and plate ratio: 18:1] | 30 parts |
| Acryl varnish (solid content: 60%) | 82 parts |
| Melamine varnish (solid content: 60%) | 34 parts |
| Mixed solvent of Solbesso 100 (produced by Tonen Sekiyu Kagaku Co., Ltd.)/ butyl acetate (weight ratio: 7/3) | 30 parts |

Mixture O was dispersed by a sand mill. 50 parts of Mixture O and 50 parts of Mixture D were uniformly mixed to obtain a coating composition XIII (containing 8.55 parts by weight of plate-like maghemite particles and 3.2 parts by weight of the quinacridone pigment based on 100 parts by weight of the coating composition).

Coating Compositions I to XIII of Examples 1 to 13 and Comparative Coating Compositions I to VII of Comparative Examples 1 to 7 prepared as described were respectively diluted by a thinner to have a viscosity suitable for spraying (14 second expressed as Ford viscosity cup No. 4), and were sprayed by an air-spray gun onto a steel panels which had been subjected to an under-coat treatment. After a 10-minute drying, a clear coating material (acrylic melamine resin) was sprayed by an air-spray gun. After drying at the room temperature for 15 minutes, the sprayed materials were cured by being baked at 140° C. for 30 minutes, thereby obtaining coated steel panels.

The geometrical metamerism and the hiding power were measured on these coated panels. The results are shown in Table 1. The conponents of the coating compositions are shown in Table 2.

The measurement of the hiding power was conducted by spraying the coating compositions on a black-and-white art paper and determining a coating thickness at which the distinction between the white and black backgrounds became unnoticeable as the perfect hiding thickness. The thinner the coating thickness, the higher the hiding power.

The geometrical metamerism was shown changes of hue H and chroma C which were measured for a varying light-receiving angle while maintaining the incident angle constant. The hue H was determined by a formula: $H = \tan^{-1} b^*/a^*$, and the chroma C was determined by the formula: $C = [(a^*)^2 + (b^*)^2]^{\frac{1}{2}}$. Namely, the geometric metamerism of the present invention was shown as changing ratios ($\Delta H$ and $\Delta C$) of hue and chroma as calculated from values obtained when the light-receiving angle is set to $-45°$ and $+45°$ while the incident angle is fixed to $-70°$. The greater the values of $\Delta H$ and $\Delta C$, the higher the geometric metamerism.

TABLE 1

| | Geometrical metamerism | | |
|---|---|---|---|
| | ΔH | ΔC | Hiding power |
| Example 1 | 19.0 | 18.5 | 22 |
| Example 2 | 19.7 | 19.7 | 19 |
| Example 3 | 21.6 | 22.6 | 25 |
| Example 4 | 13.4 | 17.4 | 22 |
| Example 5 | 14.6 | 20.8 | 25 |
| Example 6 | 17.2 | 23.2 | 28 |
| Example 7 | 12.3 | 17.1 | 30 |
| Example 8 | 16.4 | 21.0 | 32 |
| Example 9 | 14.8 | 24.5 | 35 |
| Example 10 | 12.8 | 19.2 | 38 |
| Example 11 | 14.3 | 23.5 | 14 |
| Example 12 | 11.4 | 21.7 | 14 |
| Example 13 | 16.7 | 18.9 | 20 |

TABLE 1-continued

| | Geometrical metamerism | | |
|---|---|---|---|
| | ΔH | ΔC | Hiding power |
| Comp. Example | | | |
| 1 | 2.3 | 3.5 | 29 |
| 2 | 6.3 | 9.2 | 20 |
| 3 | 4.2 | 7.1 | 18 |
| 4 | 2.1 | 2.1 | 33 |
| 5 | 3.1 | 5.1 | 65 |
| 6 | 3.9 | 13.6 | 43 |
| 7 | 8.9 | 14.5 | 17 |

TABLE 2

| | Iron oxide particles (based on 100 parts by weight of the coating composition) | Pigment | | | | Film forming polymer (based on 100 parts by weight of the coating composition) | Organic solvent (based on 100 parts by weight of the coating composition) |
|---|---|---|---|---|---|---|---|
| | | based on 100 parts by weight of the iron oxide particles) | (based on 100 parts by weight of the coating composition) | Coloring pigment (based on 100 parts by weight of the coating composition) | Mica pigment (based on 100 parts by weight of the coating composition) | Metal powder pigment (based on 100 parts by weight of the coating composition) | | |
| Example 1 | 8.55 | 37.4 | 3.2 | 3.2 | — | — | 42.05 | 46.2 |
| Example 2 | 8.55 | 37.4 | 3.2 | 3.2 | — | — | 42.05 | 46.2 |
| Example 3 | 8.55 | 37.4 | 3.2 | 3.2 | — | — | 42.05 | 46.2 |
| Example 4 | 8.55 | 37.4 | 3.2 | 3.2 | — | — | 42.05 | 46.2 |
| Example 5 | 8.55 | 37.4 | 3.2 | 3.2 | — | — | 42.05 | 46.2 |
| Example 6 | 8.55 | 37.4 | 3.2 | 3.2 | — | — | 42.05 | 46.2 |
| Example 7 | 5.13 | 87.3 | 4.48 | 4.48 | — | — | 43.07 | 47.32 |
| Example 8 | 5.13 | 102.7 | 5.27 | 3.9 | 1.37 | — | 42.73 | 44.23 |
| Example 9 | 4.275 | 158.4 | 6.77 | 3.35 | 3.42 | — | 42.48 | 46.48 |
| Example 10 | 8.55 | 100 | 8.55 | — | 8.55 | — | 39.5 | 43.4 |
| Example 11 | 8.55 | 59.4 | 5.08 | 0.64 | — | 4.44 | 40.01 | 46.36 |
| Examplw 12 | 8.55 | 59.4 | 5.08 | 0.64 | — | 4.44 | 40.01 | 46.36 |
| Example 13 | 8.55 | 37.4 | 3.2 | 3.2 | — | — | 42.05 | 46.2 |
| Comparative EX 1 | 8.55 | 37.4 | 3.2 | 3.2 | — | — | 42.05 | 46.2 |
| Comparative EX 2 | — | — | 7.13 | 5.42 | 1.71 | — | 44.43 | 48.44 |
| Comparative EX 3 | — | — | 6.79 | 5.08 | 1.71 | — | 44.77 | 48.44 |
| Comparative EX 4 | 8.55 | 37.4 | 3.2 | 3.2 | — | — | 42.05 | 46.2 |
| Comparative EX 5 | 8.55 | 37.4 | 3.2 | 3.2 | — | — | 42.05 | 46.2 |
| Comparative EX 6 | 8.55 | 37.4 | 3.2 | 3.2 | — | — | 42.05 | 46.2 |
| Comparative EX 7 | 17.1 | — | — | — | — | — | 39.5 | 43.4 |

What is claimed is:

1. A coating composition comprising plate-like iron oxide particles having an average particle diameter of 4 to 25 μm, a lamellar thickness of 0.16 to 5 μm and a plate ratio (average particle diameter:lamellar thickness) of 5:1 to 25:1; a coloring pigment; a film-forming polymer; and an organic solvent.

2. A coating composition comprising plate-like iron oxide particles having an average particle diameter of 4 to 25 μm, a lamellar thickness of 0.16 to 5 μm and a plate ratio (average particle diameter:lamellar thickness) of 5: 1 to 25:1; a mica pigment; a film-forming polymer; and an organic solvent.

3. A coating composition comprising plate-like iron oxide particles having an average particle diameter of 4 to 25 μm, a lamellar thickness of 0.16 to 5 μm and a plate ratio (average particle diameter:lamellar thickness) of 5:1 to 25:1; a metal powder pigment; a film-forming polymer; and an organic solvent.

4. A coating composition according to claim 1, 2 or 3, wherein the amount of said film-forming polymer is 30 to 60 parts by weight based on 100 parts by weight of said coating composition.

5. A coating composition according to claim 1, 2 or 3, wherein the amount of said organic solvent is 5 to 60 parts by weight based on 100 parts by weight of said coating composition.

6. A coating composition according to claim 1, 2 or 3, wherein the amount of said plate-like iron oxide particles is 0.005 to 50 parts by weight based on 100 parts by weight of said coating composition.

7. A coating composition according to claim 1, 2 or 3, wherein the amount of the pigment is 0.005 to 50 parts by weight based on 100 parts by weight of said coating composition and 0.01 to 10,000 parts by weight based on 100 parts by weight of said plate-like iron oxide particles.

8. A coating composition according to claim 5, wherein an amount of the coloring pigment is not more than 30 parts by weight based on 100 parts by weight of said coating composition.

9. A coating composition according to claim 2, wherein the amount of the mica pigment is not more than 30 parts by weight based on 100 parts by weight of said coating composition.

10. A coating composition according to claim 3, wherein the amount of the metal powder pigment is not more than 30 parts by weight based on 100 parts by weight of said coating composition.

11. A coating composition according to claim 1, 2 or 3, wherein said plate-like iron oxide particles are plate-like hematite particles having an average particle diameter of 4 to 25 μm, a lamellar thickness of 0.16 to 5 μm and a plate ratio (average particle diameter:lamellar thickness) of 5:1 to 25:1.

12. A coating composition according to claim 1, wherein said plate-like iron oxide particles are plate-like magnetite particles having an average particle diameter of 4 to 25 μm, a lamellar thickness of 0.16 to 5 μm and a plate ratio (average particle diameter:lamellar thickness) of 5:1 to 25:1.

13. A coating composition according to claim 1, 2 or 3, wherein said plate-like iron oxide particles are plate-like maghemite particles having an average particle diameter of 4 to 25 μm, a lamellar thickness of 0.16 to 5 μm and a plate ratio (average particle diamer:lamellar thickness) of 5:1 to 25:1.

* * * * *